May 7, 1935.                R. D. SMITH                2,000,572
           MECHANISM FOR OPERATING UPON AUTOMOBILE AXLES
                    Filed Nov. 10, 1932        2 Sheets-Sheet 1

ROY D. SMITH  INVENTOR
BY
Merrill M. Blackburn.
ATTORNEY

May 7, 1935.  R. D. SMITH  2,000,572
MECHANISM FOR OPERATING UPON AUTOMOBILE AXLES
Filed Nov. 10, 1932  2 Sheets-Sheet 2

ROY D. SMITH INVENTOR

BY Merrill M. Blackburn.
ATTORNEY

Patented May 7, 1935

2,000,572

UNITED STATES PATENT OFFICE 2,000,572

MECHANISM FOR OPERATING UPON AUTOMOBILE AXLES

Roy D. Smith, Davenport, Iowa, assignor to Bee Line Manufacturing Company, Davenport, Iowa, a corporation of Iowa Application November 10, 1932, Serial No. 641,950

14 Claims. (Cl. 153—32)

The present invention pertains to a mechanism of the type illustrated in application Serial No. 512,851, filed February 2, 1931, by Frank J. Fransen, and consists of various improvements upon that structure. Among the objects of this invention are to provide a structure for the purpose indicated which is readily portable; to provide a structure of the nature indicated which may be put under an automobile and then raised into an axle-engaging position; to provide a structure which can be readily leveled up so that the vises at the two sides thereof may be made to engage opposite end portions of an axle simultaneously, notwithstanding the fact that the floor or ground beneath the machine may be irregular in form; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Figure 1:
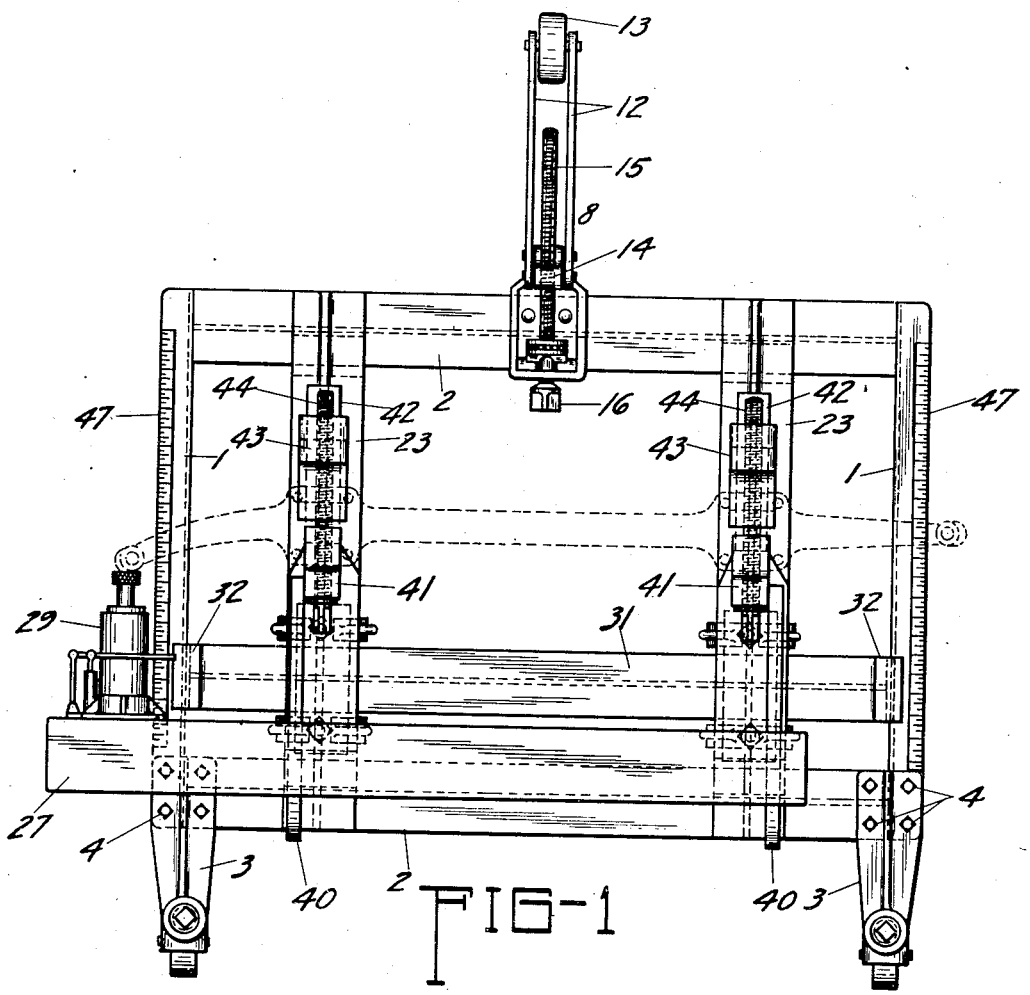
Fig. 1 is a plan view of my improved structure.

The supporting frame is preferably substantially rectangular and comprises a pair of side channel members 1 and cross I-beams 2, the members 1 and 2 being secured together at the corners of the frame in any suitable manner, as by electric welding. A pair of brackets 3 are attached to the front corners of the frame. These are shown as being attached by means of bolts 4. The brackets 3 are illustrated as having internally screw-threaed eyes 5 at their free ends. Screw-threaded members 6 pass through these eyes and the threads thereof engage the threads of the eyes. At their lower ends, members 6 have a swivel connection with the casters 7, thus permitting the casters to turn when the device is being moved in such a direction that the casters should follow. The upper ends of the members 6 are made angular to be engaged by a suitable wrench by means of which they may be turned to cause elevation of the front end of the frame. The purpose of this will be obvious but will be referred to further hereinafter.

At the middle of the rear side of the frame is a lifting device 8, comprising a bracket 9 suitably secured to the I-beam 2 and having a lever 10 pivotally connected thereto at 11. As shown in Fig. 1, this lever comprises a pair of bars 12 which have a wheel 13 rotatably mounted between their remote ends. A nut 14 is mounted between the other ends of the members 12 and may oscillate upon a substantially horizontal axis to compensate for the change in angle between the plates 12 and screw 15 as the latter is turned one direction or the other in the nut 14. The bolt 15 has a squared end 16 to be engaged by a suitable wrench whereby the bolt may be turned in the nut 14 to advance the same longitudinally with relation thereto. The bracket 9 has an upturned end 17 which has a hole therethrough for reception of one end of the bolt 15. A bolt or bolts 18 and rivets 19 hold the bracket 9 to the frame member 2. Also, if desired, this bracket may be welded to the frame member though this does not seem to be necessary as the strain tending to separate the bracket 9 and the frame is not excessive. The up-standing arm 17 has a boss surrounding the opening referred to, the surface of the boss being preferably somewhat spherical, though a frusto-conical surface will work if one prefers to use it. The member 20 has a concavity in its face adjacent the boss, which concavity is shaped similarly to the face of the boss. A collar 21 surrounds the screw 15 and is connected thereto so as to be immovable longitudinally of the screw. Balls are mounted between the members 20 and 21 to furnish a ball bearing for the screw 15 so that the latter will turn easily with relation to the extension 17. It will be seen from the foregoing that when the screw 15 is turned the nut 14 will be caused to move away from the frame or permitted to move towards the same. This will result in bringing the wheel 13 forwardly and will necessarily result in the pivot point 11 being lifted, thus raising the rear part of the frame.

Hence it will be seen that the frame is tilted transversely and longitudinally to bring the vises into exact registration with the work to be clamped and held thereby.

A pair of deep I-beams 23 are mounted upon and shiftably secured to the I-beams 2 and are provided with openings 24, 25 and 26 for the reception of suitable operating means in the form of a bar 27 and a lever 28. As shown in Fig. 1, the bar is mounted in the two openings 26 and serves as an abutment for a jack 29 by means of which pressure is applied to an end of an axle, shown in dotted lines in the drawings. The jack 29 is preferably, though not necessarily, of the hydraulic type. As illustrated in this figure, this arrangement is for bending an axle in a horizontal direction. It will be understood that the bar 27 may be used in different ones of the openings 24, 25 and 26 to give the desired arrangement of parts.

Figure 2:
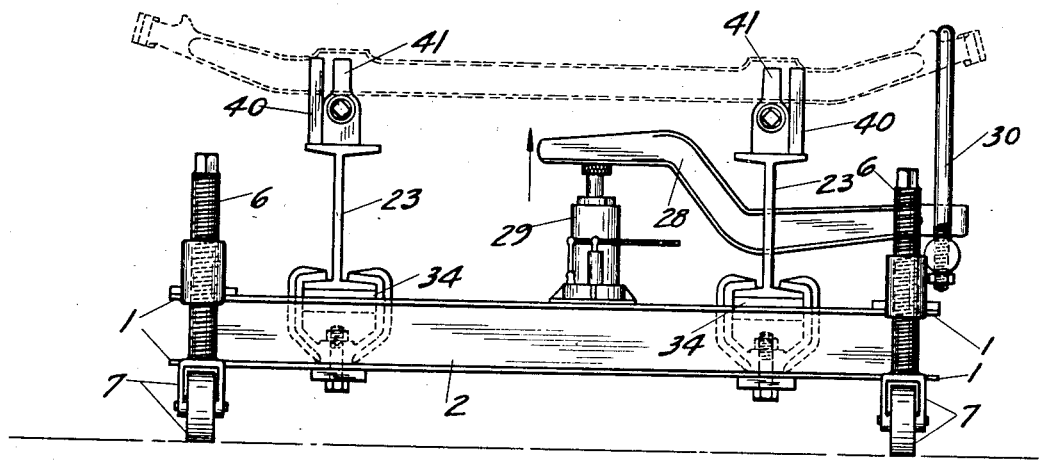
Fig. 2 is a front elevation of the structure shown in Fig. 1.

In Fig. 2, the bar 28 is shown as being mounted in an opening 25 and as having a clevis 30 straddling one end thereof and an end of the automobile axle. A jack 29 rests upon a cross beam 31 and engages the lever 28 to push upwardly thereon so as to pull downwardly upon the end of the axle. It is assumed that the axle is clamped in the vises mounted on the I-beam 23 so that it will be held rigidly in place, thus permitting bending thereof by application of the force by means of the jack 29. The beam 31 has plates 32 at its ends which slide upon the side beams 1 and support the beam with relation thereto. This arrangement makes it possible to slide the beam 31 into any desired relation with respect to the beams 1 and the superstructure supported by the frame. It is therefore possible to get the beam 31 directly below the axle so that the parts may be used as illustrated in Fig. 2.

Figure 3:
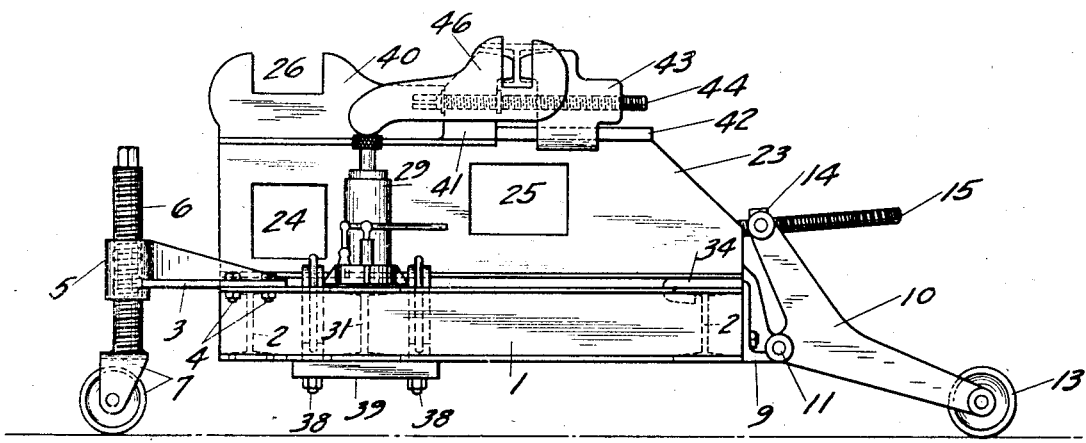
Fig. 3 is a side elevation and Fig. 4 a longitudinal section of this structure.
Figure 5:
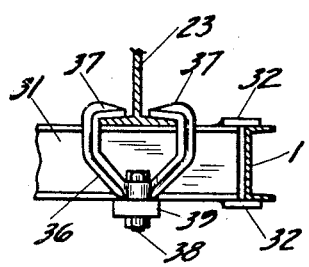
Fig. 5 is a fragmentary transverse section disclosing in greater detail a part of the structure shown less clearly in the other figures.

Hooks 34 are secured to the I-beams 23 below their forward and rearward ends, resting upon the I-beams 2 and engaging under a flange thereof to hold members 23 to the I-beams 2, in slidable relation therewith. It will thus be seen that members 23 may be moved in and out upon the frame to properly position the vises with relation to the work to be done. As shown in Fig. 5, the holding members 36 comprise a pair of hooks 37 which are secured together and have a bolt 38 passing therethrough and through the block 39 to fasten each of the holding members to the block. This block 39 extends transversely of the I-beam 31, below the same, and the hooks 37 engage the lower flanges of the I-beam 23, thereby furnishing a definite rigid support for the I-beam 31, when used as illustrated in Figs. 2 and 3. It will be obvious from the foregoing that, when the nuts on the bolts 38 are loosened, it will be possible to slide the beam 31 and the holding members 36 and 39 longitudinally of the beams 1 to any desired position of adjustment between the beams 2.

The plates 40, in which the notches 20 are located, are secured to the upper flanges of the I-beams 23, as shown most clearly in Fig. 2. As shown in Fig. 1, the plates 40 are approximately half the length of I-beams 23 and therefore end opposite the jaws 41 of the vises located upon the upper edges of the beams 23. A part of the upper flange of each beam 23 is cut away and a plate 42 is secured upon the upper edge of the web of beam 23. As shown in Fig. 1, the plates 42 extend laterally from the webs of the beams 23, thus furnishing a slideway for each of the movable jaws 43 which are reciprocated along the plates 42 by actuation of the screws 44. These latter are provided with angular portions 45 of the same size as the heads 16 and the angular portion of the screws 6. It is therefore obvious that but a single wrench is necessary for the operation of these different screws. It will be understood that any suitable adapters may be applied to the jaws 41 and 43 to fit any particular shape of axle.

Figure 4:
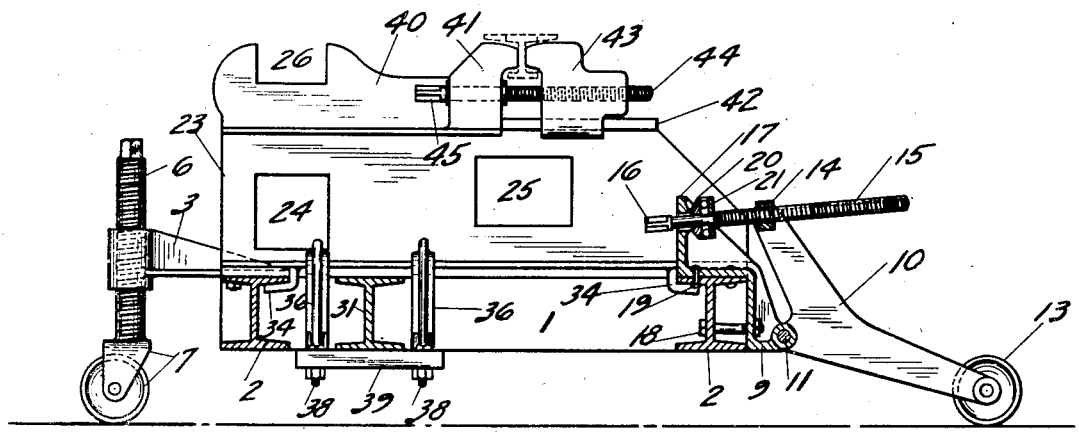

A species of wrench 46 is provided which may be engaged with the axle when it is desired to twist the latter in the manner shown in Fig. 3. When the axle is mounted in the vises, as indicated in Fig. 4, wrench 46 is applied thereto, the jack 29 being on the beam 31 and then being actuated to cause the jack plunger to engage the wrench so as to twist the axle.

It will be understood from the foregoing disclosure that the device, when lowered, may be moved under an automobile in such a position that when the screws 6 and 16 are operated the device will be raised so that the jaws will come up to a point where they can grip the axle of the automobile. Now, when the screws 6 and 16 are operated, the device will be raised and, when in proper position, operation of the screw 44 will cause the axle to be gripped, as shown in Fig. 4. The next operation will depend upon what work it is desired to do upon the axle. For example, if it is desired to bend the central portion, or an end, upwardly, the beam 31 is shoved along until it is beneath the axle and then a jack is placed thereon and operated until the desired bend is made. On the other hand, if it is a lateral bend which is desired, a bar 27 is placed in openings 26 and a jack placed between this and the axle and operated to cause the desired bend in the latter. It is believed that the operation of twisting an axle will be clear from what has been stated heretofore. After the desired operation has been performed, the screws 6 and 16 will be operated in a manner to permit the lowering of the frame, after the vises have been opened up to permit separation thereof from the axle.

It is believed that it will be obvious without further discussion how this device can be leveled up to cause both vises to engage the axle at comparable points, due to the three-point suspension by the wheel 13 and the casters 7.

The scales 47 are secured upon the upper flanges of the side channels 1 and are so arranged that the axles will be above definite given points upon the two scales, which points will be the same upon both scales if the axle is straight and tightly clamped in the vises. Therefore, it will be seen that, if the readings upon the two scales are different, the axle is not straight and the direction and amount of bend necessary can be determined by determining the difference in reading upon these scales.

It will of course be understood that the specific description of structure set forth above may be departed from without departing from the spirit of my invention as set forth in the foregoing specification and the appended claims.

Having now described my invention, I claim:

1. A structure of the character indicated comprising in combination a frame having a movable beam extending across the frame and supported to move from front to rear thereof and vice versa, said frame including flanged members, hooks engaging said flanged members and sliding on the flanges thereof, and a bar connecting said hooked members in pairs below the slidable beam and supporting said beam from the flanged members when pressure is put upon said beam tending to push it away from the flanged members.

2. A structure for the purpose indicated comprising a frame, vise-supporting means rigidly connected to said frame, means for leveling the frame, and measuring scales secured to said frame upon opposite sides of the vises, said scales being positioned in definite fixed relation to the vises so that the straightness of an axle may be checked by comparing the locations of its end portions with reference to said scales.

3. Axle straightening apparatus comprising a frame having means for adjusting the frame with relation to a horizontal plane and adjusting it in a vertical direction, holding means carried by the frame for gripping an axle and for holding an abutment bar, and an abutment bar held by said holding means and adapted to be engaged by one end of a jack for operation upon an axle.

4. Axle straightening apparatus comprising a frame having means for adjusting the frame with relation to a horizontal plane and adjusting it in a vertical direction, holding means carried by the frame for gripping an axle, hangers suspended from the frame to support an abutment bar, adjustably, beneath the frame, and an abutment bar suspended from the frame by the hangers and adapted to support a jack.

5. A structure for the purpose indicated comprising a frame, vises carried by the upper side thereof for engagement with an axle, means for raising the frame so that the vises will be in a position to engage the axle, and means for closing the vises to cause them to grip the axle, the means for raising the frame at one side comprising caster-supported-screws and at the opposite side a screw-operated-lever.

6. A structure for the purpose indicated comprising a frame, vises carried by said frame in a position to be raised to engage an automobile axle, means for raising said frame to bring the vises into engagement with the axle so that the latter may be clamped and held by the vises, means to rigidly hold a bar in substantially the same horizontal plane as the axle, and a bar held by said last mentioned means to furnish an abutment for a jack to be placed between the bar and the axle.

7. A structure for the purpose indicated comprising a frame, vises carried by said frame in a position to be raised to engage an automobile axle, means for raising said frame to bring the vises into engagement with the axle so that the latter may be clamped and held by the vises, and a bar supported and movable longitudinally of the frame to be positioned in different positions with relation to the vises.

8. A structure for the purpose indicated comprising a frame, vises carried by said frame in a position to be raised to engage an automobile axle, means for raising said frame to bring the vises into engagement with the axle so that the latter may be clamped and held by the vises, the frame-raising means comprising a pair of casters at one side of the frame, screw-threaded means connecting the casters to the frame, and a lever pivotally connected to the opposite side of the frame to be turned about its pivotal connection and cause lifting of that side of the frame.

9. A structure for the purpose indicated comprising a frame, vises carried by said frame in a position to be raised to engage an automobile axle, and means for raising said frame to bring the vises into engagement with the axle so that the latter may be clamped and held by the vises, said frame having scales connected to opposite sides thereof in definite fixed relation to the vises so that the straightness of an axle clamped in the vises may be determined by reference to the scales mounted upon the frame.

10. A structure for the purpose indicated comprising a portable frame having vises secured thereto in a position to be raised to engage an automobile axle, said vises opening at the top, and means for raising and for tilting said frame to bring the vises into engagement from below with the axle so that the latter may be clamped and held by the vises.

11. A structure for the purpose indicated comprising a frame having vises secured to the upper side thereof for engagement with an axle, said vises opening at the top to receive an axle, means for raising the frame toward the axle and for tilting the frame transversely and longitudinally so that the vises will be in a position to engage the axle, and means for closing the vises to cause them to grip the axle.

12. A structure of the character described comprising a portable frame having a plurality of vises thereon, means to raise, lower and tilt the frame transversely and longitudinally to bring the vises into exact registration with work to be gripped thereby.

13. A structure for the purpose indicated comprising a frame, vises mounted upon the frame in spaced relation, means for tilting the frame transversely and longitudinally to bring the vises into exact registration with the work to be clamped and held thereby.

14. A structure for the purpose indicated comprising a portable frame, vises mounted upon the frame in spaced relation, means for simultaneously tilting the frame transversely and longitudinally to bring the vises into registration with the work to be clamped and held thereby.

ROY D. SMITH.